Oct. 4, 1949. A. L. KELSEY ET AL 2,483,644
ELECTRONIC ANGLE INDICATION WITH PARTICULAR
REFERENCE TO RADAR SYSTEMS
Filed Jan. 21, 1947 2 Sheets-Sheet 1

Inventors
Alwyn L. Kelsey
Alvin L. Hiebert
Homer G. Tasker
William E. Osborne

Patented Oct. 4, 1949

2,483,644

UNITED STATES PATENT OFFICE 2,483,644

ELECTRONIC ANGLE INDICATION WITH PARTICULAR REFERENCE TO RADAR SYSTEMS

Alwyn L. Kelsey, North Hollywood, Alvin L. Hiebert, Beverly Hills, Homer G. Tasker, Van Nuys, and William E. Osborne, Los Angeles, Calif., assignors to Gilfillan Bros., Inc., Los Angeles County, Calif., a corporation of California Application January 21, 1947, Serial No. 723,364

17 Claims. (Cl. 343—113)

This invention is concerned with presentation of certain types of information of the screen of a cathode ray tube.

A particular problem to which our invention can be applied is in relation to a ground controlled aircraft landing system in which the location of the aircraft is determined by two ground radar systems scanning in two coordinates. For clarity of explanation we shall describe our invention primarily with reference to this particular application, but without meaning thereby to limit its scope.

In such a known two co-ordinate radar system, the system for one co-ordinate typically has an azimuth antenna scanning in azimuth and displays the azimuth angle and range of the aircraft in the usual way in terms of the position of a bright spot on the screen of a cathode ray tube operated as an expanded partial plan position indicator; and the system for the other co-ordinate has an elevation antenna scanning in elevation and similarly displays the elevation angle and range of the aircraft on an elevation cathode ray indicator tube. Each radar beam effectively covers only a limited angular range in the coordinate in which it does not scan, and must therefore be adjusted in this coordinate as the position of the landing aircraft varies. It is usual in such systems for the operator who observes, say, the azimuth angle display, and therefore knows the azimuth angle of the landing aircraft, to regulate the azimuth adjustment of the elevation antenna; and similarly the observer of the elevation display regulates the elevation adjustment of the antenna which scans in azimuth. In previous systems of this type the observer of one antenna has been given information as to the non-scanning angle covered at any moment by the other antenna, which he is to adjust, by means of mechanical devices of various kinds.

An object of our invention is to provide directly upon the cathode ray indicator tube of the radar system scanning in one coordinate a continuous indication of the limits of the angular field in that coordinate which are being covered by the second radar system scanning in another co-ordinate. When this is done for both systems, each observer has accurate and instantaneous information, directly on the indicator tube which he is observing, as to the angle of the antenna which he is to adjust. This information can be given, according to our invention, by adding to the electronic display of each system a single angle line at the angle corresponding to the axis of the radar beam of the other system. But we prefer to provide two such angle lines, representing the limits of the angular field which is effectively covered by said radar beam in a given condition of adjustment. Then each operator has only to manipulate the adjustment of the other antenna in such a way that the lines on his screen representing the angular field covered by the other antenna beam enclose the spot representing the aircraft position. Because of its typical use of two lines forming a V on the screen and following the antenna motion, we refer to our system as a V-follower system and to the lines as V-follower lines.

Since the representation of the aircraft position in either co-ordinate, and the V-follower lines indicating the antenna angle which is to be adjusted in that co-ordinate, are both imaged on the same cathode ray screen, there is no possibility of error caused by parallax in the comparison of the two positions. Both time delay and back-lash in the representation of the antenna angle are virtually eliminated. No elaborate mechanical linkages need to be set up and held in adjustment. The latter advantage is particularly important in portable equipment, which in emergencies may need to be partially disassembled, moved to a new position and put into operation again as rapidly as possible. In our electronic V-follower system this involves breaking electrical connections only. All mechanical linkages can remain intact while the equipment is moved, and are immediately ready for operation at a new location.

According to our invention the angle between the V-follower lines can readily be adjusted as desired. Any possibility of confusing these lines with other angle designating lines on the face of the tube is avoided by the use of dashed or dotted lines to indicate antenna position and of continuous lines for other purposes.

Further objects and advantages of our invention will be understood from the following description of a preferred embodiment thereof, which is to be read in conjunction with the attached drawings, of which:

Figure 1:
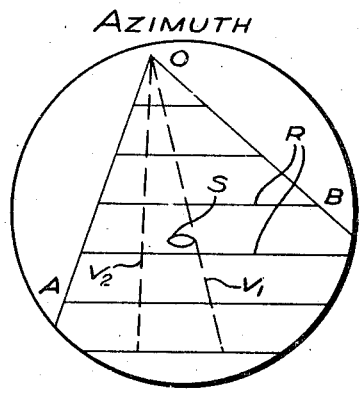
Fig. 1 shows schematically a typical pattern on the azimuth indicator tube, including V-follower lines.
Figure 2:
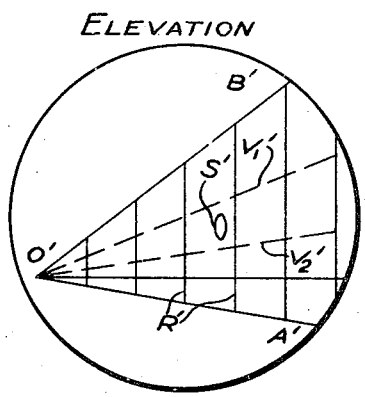
Fig. 2 shows similarly a typical elevation tube pattern.

Figs. 1 and 2 show in solid lines the usual patterns formed on the indicator tubes of the radar systems scanning in azimuth and in elevation respectively, the dashed lines being added in accordance with our invention. These entire patterns are formed by appropriately timed intensification of the cathode ray beam during its successive sweeps from the point O (O') at gradually varying angles between OA and OB (O'A' and O'B') which correspond to the varying scan angles of the antennas. Certain parts of the pattern (radial lines OA—OB, etc.) need not be made by the tube action, and the description will treat of the system as if they are not to be so made. The antennas scan through their respective angular scanning ranges first in one direction and then in the other.

Correlation between the scan angle of each antenna and the angle of sweep of the corresponding electron beam in the indicator tube is obtained with the help of a direct current angle coupling voltage developed for this purpose. This coupling voltage which varies periodically in accordance with the scanning action of the antenna, is generated by any suitable means, for example by a potentiometer linked with the scanning mechanism of the antenna, indicated schematically at 27 in Figs. 3 and 4. The dashed lines at 27b indicate these couplings schematically. This voltage is fed to the sweep amplifier 8 which has the primary function of producing current pulses of appropriate form and amplitude in the deflection coils 10d of the cathode ray tube. These current pulses cause the cathode ray beam to sweep periodically across the screen, and are so modulated in accordance with the angle coupling voltage that the position of each sweep path on the screen corresponds in some definite way to the momentary scan angle of the antenna. Ordinarily the sweep paths have a common point of origin (O and O' in Figs. 1 and 2) and sweep out from this origin at an angle which is substantially proportional to the antenna scan angle, leading to the so-called expanded partial plan position indicator pattern, as illustrated in Figs. 1 and 2. Other types of correspondence between the scan angle and the position of the corresponding path on the screen can also be used.

Associated circuits in sweep amplifier 8 develop a sweep intensifying gate or voltage pulse which is applied to the grid 10g of the indicator tube during each sweep to bring the tube to cut-off condition. The electron beam, which is not normally visible on the screen can then be rendered momentarily visible by application of a relatively small additional voltage of suitable sign to one of the tube electrodes. For example, negative voltage pulses can be applied to the cathode 10c in the usual way at proper moments during each sweep to produce the range marks R, R'. Any such signals applied to the tube at times other than during a sweep do not make the beam visible, due to absence of the sweep intensifying gate. A positive intensifying voltage is applied as usual to the anode 10a of each tube during the entire period of each scan of its corresponding antenna, rendering the tube operative as described above, and is removed after completion of each such scan to prevent the appearance of stray signals on the screen.

An object such as an aircraft within the region covered by the scanning beam produces a video signal which is amplified in the usual way and applied to the cathode 10c as a negative pulse. This produces a bright spot on the screen, the location of the spot S on the azimuth screen (Fig. 1) corresponding in the usual way to the azimuth angle and range of the aircraft, and that of spot S' on the elevation screen (Fig. 2) corresponding to the elevation angle and range.

The V-follower lines V1 and V2 on the azimuth screen coincide with sweep paths whose angles correspond to definite azimuth angles associated with the elevation antenna. Typically the latter angles are the limiting azimuth angles of the effective field of the elevation radar beam. If these lines V1 and V2 enclose the spot S, as in Fig. 1, the azimuth operator can see at once that the azimuth adjustment of the elevation antenna is correct. Otherwise he manipulates the adjustment until this condition is satisfied. Similarly the V-follower lines V'1 and V'2 on the elevation screen show the elevation operator whether the elevation adjustment of the azimuth antenna is such as to include the landing aircraft in its beam, thus enabling him to make any desired adjustment of the azimuth antenna. The azimuth and elevation operators may, of course, be the same person.

In describing our system we shall describe in detail only that part of the system which provides on the elevation indicator tube (Fig. 2) a representation of the angular field in elevation covered by the azimuth antenna, it being understood that a similar or identical system can be used to indicate on the azimuth indicator tube (Fig. 1) the position of the elevation antenna.

Figure 3:
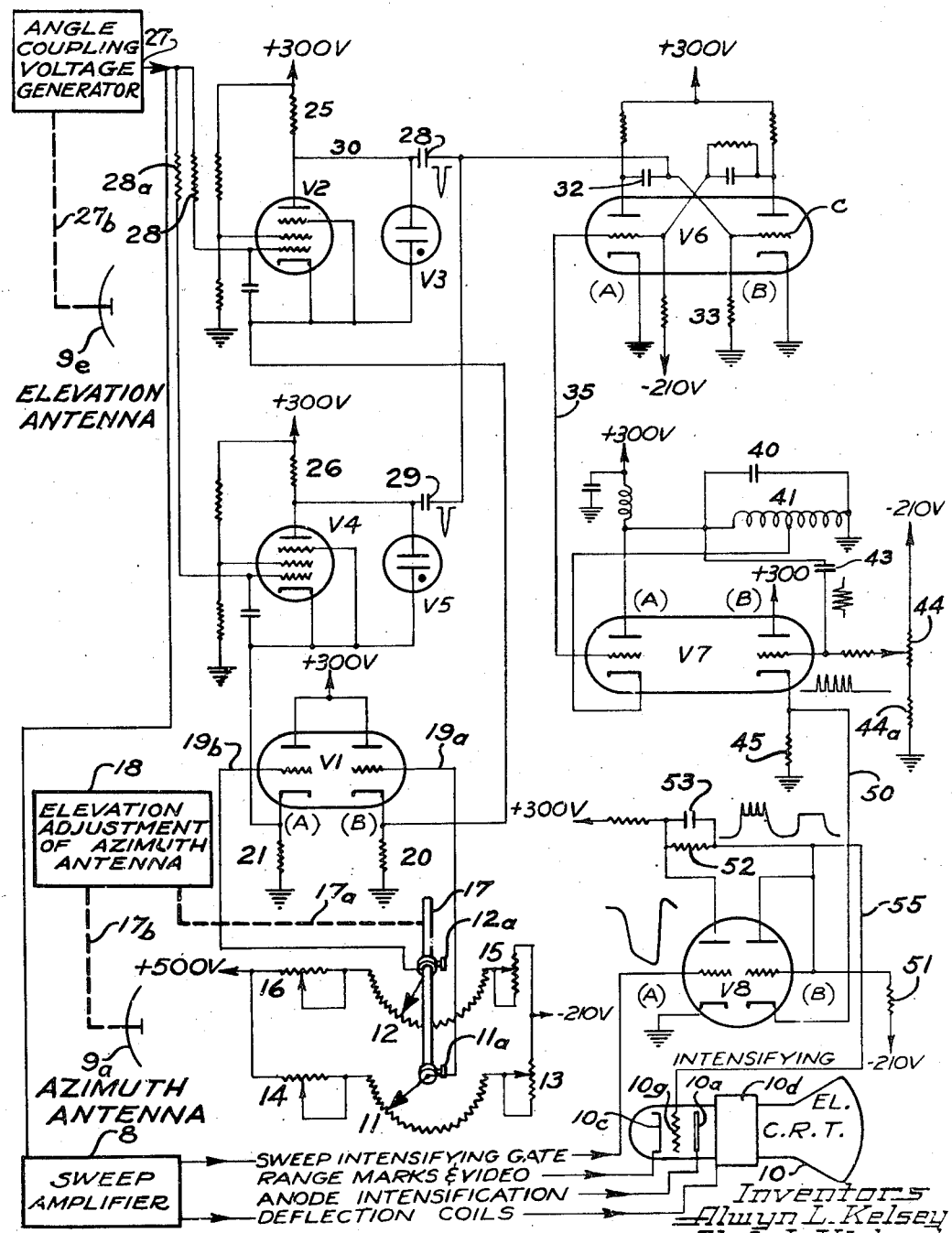
Fig. 3 is a schematic diagram of circuits by which the V-follower lines can be produced on the elevation indicator tube.

In the circuits of our invention we make use of the elevation angle coupling voltage, described above, which is already available in previous systems generated by means indicated schematically at 27 in Fig. 3. It varies typically from plus 52 volts at one end of the used scan range to plus 2 volts at the other end, and in the present instance corresponds to the (elevational) scan angle of the elevation antenna. We provide one or more additional direct current voltages which vary (in the present instance) in accordance with the elevation angle adjustment of the azimuth antenna. Such a voltage may correspond to the elevation angle of the axis of the antenna beam, or, preferably, two such voltages which we designate as V-follower voltages can be used, corresponding to the limits of the angular field in elevation which is effectively covered by the azimuth antenna. In the circuits illustrated we show means for using two voltages, resulting in the display of two angle lines on the elevation indicator tube, as described above. Appropriate modification of the equipment illustrated to give only one voltage and line, or to give more than two lines, will be obvious.

Referring now to the schematic diagram in Fig. 3, the V-follower voltages are obtained in the present preferred embodiment of our invention from two linearly wound rotary arm potentiometers 11 and 12 whose arms are adjustably linked together, as by the common shaft 17, and are linked to the mechanism, indicated schematically at 18, which controls the elevation adjustment of the azimuth antenna 9a. The latter linkage, which can be of any suitable type, mechanical or otherwise, is indicated in Fig. 3 by a dashed line 17a. Similar linkage, between the azimuth antenna 9a and mechanism 18, is indicated by the dashed line 17b. The potentiometer coils 11 and 12 are connected in parallel as shown between a positive and a negative source of voltage, and have the variable resistances 13, 14 and 15, 16 in series with them, by which the exact voltage range of each potentiometer can readily be controlled.

For each position of elevation adjustment of the azimuth antenna the V-follower voltages taken off the movable contacts of the potentiometers then have definite values, the difference between them remaining constant. As will be described, each V-follower voltage determines directly the angle on the elevation indicator tube of the corresponding V-follower line. Thus the constant difference between the two V-follower voltages determines the fixed angle between the V-follower lines on the indicator tube. As the azimuth antenna is rotated to vary its elevation, the entire V rotates correspondingly as a unit about its vertex O' on the screen. The angle between the V-follower lines and the relationship of each line to the elevation angle of the azimuth antenna can readily be adjusted, for example by loosening set screws 11a and 12a securing the potentiometer arms to shaft 17, rotating the arms through the required angle, and again tightening the set screws. Or the same adjustment can be accomplished by shifting the potentiometer ranges to higher or lower potentials by manipulation of variable resistances 13, 14 and 15, 16. We assume for the present description that the arms are so adjusted that the take-off voltage of potentiometer 11 is more positive than that of 12.

The V-follower voltages, obtained as just described at the movable contacts of potentiometers 11 and 12, are compared, by means of the circuitry in Fig. 3, with the elevation angle coupling voltage developed at 27. As the latter periodically becomes less positive during a given scanning cycle of the elevation antenna, the relationship between the angle coupling voltage and first one and then the other of the V-follower voltages passes through a particular condition, as will be described, and triggers the electronic circuits, producing V-follower lines on the elevation indicator tube.

The two V-follower voltages are applied by lines 19a and 19b respectively to the grids of the cathode follower coupling tube V1, sections B and A, thus controlling the currents through these tube sections, and the voltage drops in their cathode resistors 20 and 21. The potentials of the two cathodes of tube V1, and also of the cathodes of tubes V2 and V4 which are directly connected respectively to them, are thus determined. The plates of tubes V2 and V4 are connected through plate resistors 25 and 26 respectively to a positive supply, and their control grids are connected through resistances 28 and 28a to the source 27 of elevation angle coupling voltage, obtained as already indicated from the system previously in use. Gas tube V3 is connected between the cathode and plate of tube V2, and gas tube V5 is similarly connected in parallel with tube V4. The multivibrator tube V6 has its control grid c coupled via condenser 28 to the positive electrodes of tubes V2 and V3 and via condenser 29 to the positive electrodes of tubes V4 and V5.

The voltage across gas tube V3, for example, is essentially equal to the voltage drop in tube V2, determined by its grid bias. This varies periodically with the angle coupling voltage, which controls the grid potential; and it depends also upon the cathode potential, derived from potentiometer 11. Thus we consider the momentary grid bias to be determined by a comparison of the angle coupling voltage and the V-follower voltage. For a given value of the V-follower voltage, some definite value of the coupling voltage will bring the grid bias in tube V2 to the predetermined value at which gas tube V3 will start conducting. As the angle coupling voltage becomes less positive during a scan cycle, the voltage across gas tube V3 increases, until the tube fires. The value of the angle coupling voltage at which tube V3 fires determines the angle of V-follower line V'1 in Fig. 2 (see below), and is itself determined, as just described, by the setting of potentiometer 11. By suitable selection of the circuit constants of the potentiometer and cathode follower circuits, the relationship between the V-follower voltage and the angle coupling voltage at which tube V3 fires can be predetermined in such a way that the position of the V-follower line on the screen will correctly represent the potentiometer setting, and will therefore correspond in a definite and predetermined manner to the elevation adjustment of the azimuth antenna.

Similarly, the potential across gas tube V5 will increase as the coupling voltage becomes less positive, until the gas tube fires at some particular value of the coupling voltage, determined by the setting of potentiometer 12. Since we have assumed the take-off voltage at potentiometer 11 to be more positive than at 12, the cathode of tube V2 is more positive than that of V4, and for a given angle coupling voltage the potential across gas tube V3 is higher than that across V5. Therefore as the angle coupling voltage becomes less positive, gas tube V3 will fire first, and tube V5 will fire later, when the angle of the sweep path on the screen has decreased by an amount which corresponds to the difference in the take-off voltages at the two potentiometers.

As the elevation antenna scans in one direction or the other, say from higher to lower values of the elevation angle, the angle coupling voltage and hence the grid voltages of tubes V2 and V3, vary smoothly from more positive to less positive values. The currents through tubes V2 and V3 therefore gradually decrease, increasing the voltage across the associated gas tubes. When the voltage across first one gas tube (V3) and then the other (V5) reaches its critical potential the tubes fire, dropping the voltage first in condenser 28 and then in condenser 29 to a low value, in each instance applying a negative pulse to control grid c of the multivibrator tube V6. This triggers the multivibrator, producing a V-follower line on the screen (see below).

As the antenna scans in the opposite direction, gradually raising the positive angle coupling voltage, the voltage across the gas tubes is similarly lowered until it is insufficient to maintain ionization in them, so that first one tube (V5) and then the other (V3) goes out. Positive going pulses are then transmitted in sequence through condensers 29 and 28 to the multivibrator. But this has returned to its normal state and the positive pulses have no significant effect. Thus the V-follower lines are produced on the screen during the antenna scan in one direction only and not during the scan in the other direction. However, this gives satisfactory visibility to the lines and has the advantage of distinguishing them from the remainder of the pattern by the resulting characteristic flicker.

The two sections of multivibrator tube V6 are connected as indicated to form a conventional multivibrator of which section B is normally conducting. The grid c of section B, which is the control grid of the multivibrator, is coupled to gas tubes V3 and V5 as explained, and is connected through resistance 33 to ground and coupled via condenser 32 to the plate of section A. Line 35 connects the grid of section A to the grid of tube V7 section A. The application of a negative pulse to the grid c of section B (tube V6) causes the multivibrator to shift abruptly to its unstable condition in which section A is conducting and section B non-conducting. The vibrator then returns to its normal condition after a definite time interval which is determined primarily by the time required for condenser 32 to discharge to ground through resistance 33. The requirements for this time constant will be described later.

The abrupt shift of multivibrator tube V6 to its unstable condition makes the plate voltage of its section B more positive and thus applies a positive going voltage via line 35 to the grid of tube V7 section A, which is normally biased below cut-off. This tube is connected in a conventional oscillator circuit of suitable frequency, determined primarily by the values of capacity 40 and inductance 41. Oscillations are set up in the plate circuit of tube V7 section A as soon as the positive pulse arrives at its grid, and are cut off again when its grid is again biased below cut-off by the return of the multivibrator tube V6 to its stable condition, with the consequent return of its B plate to its normal only slightly positive voltage.

During the short determined period when the oscillator is operating, a high frequency wave is transmitted through condenser 43 and is applied to the grid of tube V7 section B. The cathode of this tube is connected to ground through resistor 45. It acts as a cathode follower, but its grid is so biased (by a voltage dividing network composed of potentiometer 44 and resistor 44a) as to rectify the oscillating signal voltage, transmitting any desired fraction of the positive peaks. The rectified voltage wave, which now consists of relatively sharp and clearly separated positive going peaks, is transmitted over line 50 to the cathode of clipping tube V8 section B.

Tube V8 is a part of the previously known system, and only a slight change in its connections is required to adapt it to our invention. Its normal function in the known system is to amplify (in section A) and to clip (in section B) the intensifying gate, which is then applied to grid 10g of the cathode ray indicating tube 10 during each sweep of its beam. This intensifying gate brings the indicator tube to cut-off condition, so that any negative going pulse applied to the tube cathode, as by the range signals or the video signal, or any further positive swing of the grid itself will make the cathode ray beam visible on the screen. The intensifying gate, generated in the usual way, is applied as a negative going pulse to the grid of amplifying tube V8 section A, causing a corresponding positive swing of its pate potential. Section B of this tube is connected as a diode, with its grid and plate connected together and normally held below cut-off at a potential determined by the voltage dividing network 51, 52 connected between a source of negative voltage and the plate of section A, which is normally only moderately positive due to high plate current. When the plate of section A becomes suddenly more positive in response to the intensifying gate, it carries the plate of section B with it, but only to a voltage sufficiently more positive than the cathode to cause current to flow in the diode. This holds the diode plate at a definite voltage above the cathode, thus normally transforming the somewhat irregular wave form of the original gate into an accurately flat-topped wave form suitable for application via line 55 to the grid 10g of indicator tube 10.

When our invention is applied, the action of tube V8 is like that described above, except that the cathode of section B receives (over line 50) the positive going voltage pulses generated in tube V7 as explained. In the absence of an intensifying gate the diode (tube V8, section B) cannot conduct and the pulses are blocked by the tube. But when the diode is made conducting by the gate, the pulses are transmitted through the tube and superposed upon the normally flat top of the gate. Each pulse so aded to the gate voltage brings the grid 10g of the indicator tube above cut-off, thus rendering the beam momentarily visible. Since the beam is sweeping across the cathode ray screen (the gate coincides with a sweep) this results in a series of visible dots or dashes along the sweep path, each dot corresponding to one peak of the oscillations of tube V7 section A. The spacing of these dots depends upon the frequency of the oscillator, while the relative length and the intensity of the dots depends upon the extent to which the oscillator output is clipped by tube V7 section B, controllable by varying its grid bias.

Dots continue to appear on the screen on indicator tube 10 during successive sweeps so long as the oscillations continue, or so long as multivibrator tube V6 remains in its unstable state with its section A conducting. The time constant of the multivibrator is preferably made somewhat longer than one complete sweep period, (that is, the time interval between the start of one sweep and the start of the succeeding sweep) which is typically of the order of 0.0005 second. The actual duration of a single outward sweep is much shorter than this. Then, regardless of the point in the sweep cycle at which the multivibrator happens to be tripped, there will always appear at least one complete row of dots, and not more than two.

It will be understood that the V-follower lines can be made to appear on the tube screen independently of the intensifying gate, for example by applying the voltage pulses from the oscillator to another electrode than the grid, the circuit being modified in a suitable manner so that the intensifying pulses applied are of appropriate sign and amplitude for the electrode selected.

Figure 4:
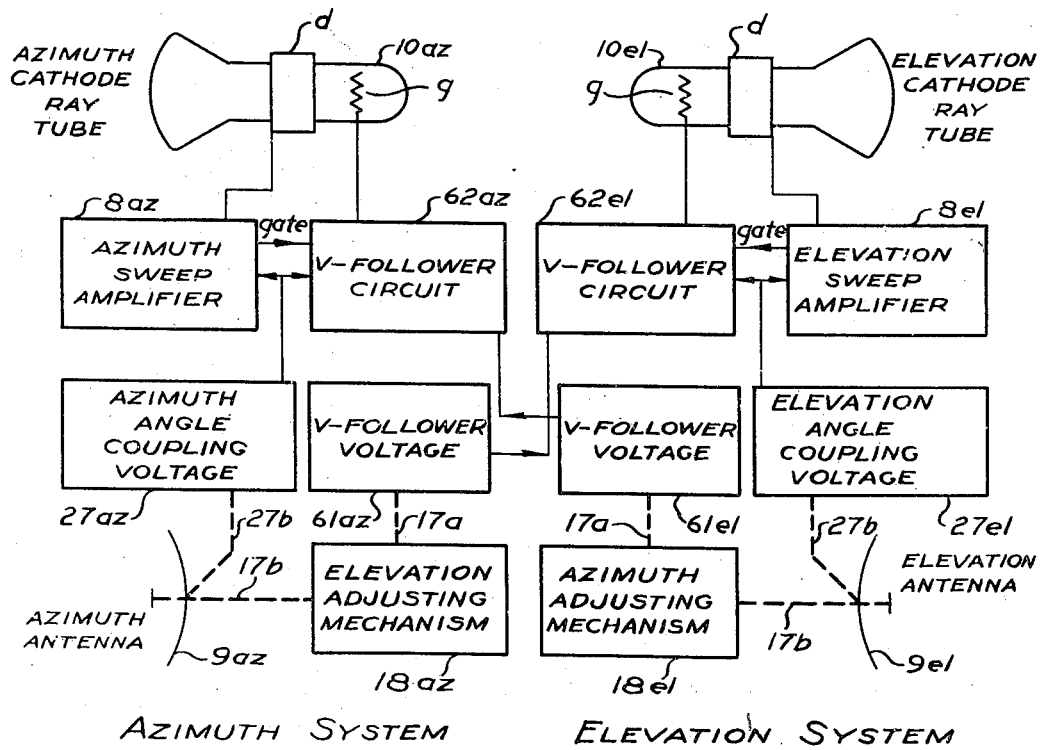
Fig. 4 is a block diagram illustrating application of our invention to a two coordinate radar system.

The above described system is ordinarily applied to both components of a two-coordinate radar system, as indicated in block form in Fig. 4. The azimuth and elevation antennas are indicated respectively at 9az and 9el; the cathode ray indicator tubes at 10az and 10el; the angle coupling voltage generators (depending upon scan angle) at 27az and 27el; the antenna adjusting mechanisms (operating in the coordinate not scanned) at 18az and 18el; and the sweep amplifiers (modulated by the coupling voltages) at 8az and 8el. The elements 8, 10, 18 and 27 of Fig. 3 correspond respectively to 8 el, 10el, 18el and 27el of Fig. 4. Means for generating V-follower voltages in accordance with the elevation adjustment 18az of the azimuth antenna 9az are indicated at 61az (corresponding to potentiometers 11 and 12 and associated elements in Fig. 3). These feed into the elevation V-follower circuiting 62*el* which includes generally the circuits shown in Fig. 3 except for potentiometers 11 and 12. The output from 62*el* is applied to the grid *g* of elevation indicator tube 10*el* as already described. The corresponding V-follower circuiting for azimuth indicator tube 10*az* is shown at 62*az*, controlled by the elevation V-follower voltage generated in 61*el*, which is actuated from the azimuth adjustment mechanism 18*el* of the elevation antenna 9*el*. The output of azimuth V-follower circuit 62*az* is applied to the grid of the azimuth indicator tube 10*az*. It will be noted that this dual V-follower system introduces an interconnection between the previous azimuth and elevation radar systems, in that each V-follower circuit 62, although using the angle coupling voltage from its own system, receives V-follower voltage (or voltages) from the other system.

We claim:

1. In a system including means for developing a variable voltage the value of which corresponds to the position of a movable element, and a cathode ray tube having a fluorescent screen and having associated with it means for producing in it an electron beam and means for deflecting the beam in accordance with said voltage; means for indicating on the screen the position of a second element which is independently movable in spatial relation to the first said element, comprising in combination means for developing a second voltage which has a predetermined value for every position of the second element, means for comparing the second voltage with the first mentioned voltage, and means acting by virtue of the two voltages attaining a predetermined relationship to modify the intensity of the cathode ray beam at the screen.

2. In a radar system having one radar antenna which scans in a definite coordinate, its video output being displayed with respect to that coordinate on the screen of a cathode ray tube, and having an element which is independently movable in the same coordinate; means for displaying on the screen of the cathode ray tube the position of the said element, comprising in combination means for developing two voltages the values of which correspond respectively to the scanning position of the first antenna and to the variable position of the element, circuit means capable of two electrical conditions and responsive to the relative values of the two voltages, said circuit means being shiftable from one electrical condition to the other by virtue of the two voltages attaining a predetermined relationship, and means for modifying the intensity of the cathode ray beam at the screen in response to each such shift of condition of the said circuit means.

3. Indicating means as defined in claim 2 and in which the said movable element is a second antenna which is movable independently of the first antenna.

4. In a system including means for developing a periodically varying voltage, each value of which corresponds to a definite angle measured in a plane, a cathode ray tube having a fluorescent screen and having associated with it means for producing in it an electron beam and means for periodically deflecting the electron beam to describe a line on the screen, the position of the line varying in accordance with said voltage, and an element independently rotatable in the said plane; means for indicating the angular position of the element, comprising in combination means operatively associated with the element for developing a second voltage which varies in accordance with the angular position of the element, circuit means responsive to the relative values of the two voltages and including a tuned circuit capable of an oscillatory and a non-oscillatory condition, said tuned circuit being shiftable from its non-oscillatory to its oscillatory condition by virtue of the said voltages attaining a predetermined relationship, and means for rendering the cathode ray beam visible on the screen in response to peaks of the oscillations.

5. Indicating means as defined in claim 4 and including means for returning the tuned circuit to its non-oscillatory condition after a time interval longer than the period between the generation of successive sweep lines on the screen.

6. In a system including means for developing a periodically varying voltage, each value of which corresponds to a definite angle measured in a plane, a cathode ray tube having a fluorescent screen and having associated with it means for producing in it an electron beam and means for deflecting the electron beam to describe a line on the screen, the position of said line varying in accordance with said voltage, and an element independently rotatable in the said plane; means for indicating the angular position of the element, comprising in combination means for developing a second voltage which varies in accordance with that angular position, means for comparing the second voltage with the first mentioned voltage, a tuned circuit so associated with the last mentioned means as to oscillate during a predetermined time interval after the two voltages have attained a predetermined relationship, and means for rendering the cathode ray beam visible on the screen in response to peaks of said oscillation.

7. In a system including means for developing a periodically varying voltage, each value of which corresponds to a definite angle measured in a plane, a cathode ray tube having a fluorescent screen and having associated with it means for producing in it an electron beam and means for deflecting the electron beam to describe a line on the screen, the position of the line varying in accordance with said voltage, and an element independently rotatable in said plane; means for indicating the angular position of the element, comprising in combination means operatively associated with the element for developing a second voltage which varies in accordance with the angular position of the element, circuit means responsive to the relative values of the two voltages and including a multi-vibrator capable of two electrical conditions, said multivibrator being shiftable from one condition to another by virtue of the said voltages attaining a predetermined relationship, and means for modifying the intensity of the cathode ray beam at the screen in accordance with the condition of the multivibrator.

8. In a system including means for developing a periodically varying voltage, each value of which corresponds to a definite angle measured about an axis, a cathode ray tube having a fluorescent screen and having associated with it means for producing in it an electron beam and means for deflecting the electron beam to describe a line on the screen, the position of said line varying in accordance with said voltage, and an element related to a second variable angle measurable about said axis; means for indicating the value of the second mentioned angle, comprising in combination means for developing a second voltage related to the second mentioned angle, means for comparing the second voltage with the first mentioned voltage, circuit means including a multivibrator which is shifted from its stable to its unstable state by virtue of the two compared voltages reaching a predetermined relationship, and is returned to its stable state after a predetermined time interval, and means for rendering the cathode ray beam visible on the screen during that time interval.

9. In a system including means for developing a periodically varying voltage, each value of which corresponds to a definite angle measured about an axis, a cathode ray tube having a fluorescent screen and having associated with it means for producing in it an electron beam and means for deflecting the electron beam to describe a line on the screen, the position of said line varying in accordance with said voltage, and an element related to a second variable angle measurable about said axis; means for indicating the value of the second mentioned angle, comprising in combination means for developing a second voltage related to the second mentioned angle, means for comparing the second voltage with the first mentioned voltage, circuit means including a multivibrator which is shifted from its stable to its unstable state by virtue of the two compared voltages reaching a predetermined relationship, and is returned to its stable state after a predetermined time interval, a tuned circuit so connected as to oscillate when the multivibrator is in its unstable state, and means for rendering the cathode ray beam visible on the screen in response to peaks of said oscillation.

10. In a radar system including one antenna which scans in a definite angular coordinate, a second antenna which is adjustable in that coordinate and which effectively covers a definite angular range therein, a cathode ray tube having a fluorescent screen and having associated with it means for producing in it an electron beam and means for periodically deflecting the electron beam to describe a sweep line on the screen, the position of said sweep line varying in accordance with the scan angle of the first antenna; means for indicating the angular range covered by the second antenna in its momentary condition of adjustment, comprising in combination means for developing a first voltage the value of which corresponds to the scan angle of the first antenna, means for developing second and third voltages the values of which correspond respectively to angles representing the two angular limits of the said range, means for independently comparing each of the second and third voltages with the first voltage and for producing a voltage pulse of definite sign in response to a predetermined relationship between the voltages of either compared pair, and circuit means acting in response to each such voltage pulse to modify the intensity of the electron beam and thereby render visible on the screen the position of a sweep line.

11. Indicating means as defined in claim 10 and in which the said circuit means includes a multivibrator which is shiftable from its stable to its unstable condition in response to each said voltage pulse, and which is returned to its stable position after a time interval longer than the period between the production of successive sweep lines, and means acting by virtue of the multivibrator being in its unstable condition to modify the intensity of the electron beam and thereby to render visible on the screen the position of a sweep line.

12. In a two-coordinate radar system in which one antenna scans in one angular coordinate and is adjustable in a second angular coordinate, its video output being displayed on the screen of a first cathode ray tube, and in which a second antenna scans in the second said coordinate and is adjustable in the first said coordinate, its video output being displayed on the screen of a second cathode ray tube; means for producing, on the screen of the first cathode ray tube, cathode ray beam indication of the condition of adjustment of the second antenna, and means for producing, on the screen of the second cathode ray tube, cathode ray beam indication of the condition of adjustment of the first antenna.

13. In a two-coordinate radar system in which one antenna scans in one angular coordinate and is adjustable in a second angular coordinate, effectively covering a definite angular range in the second coordinate, its video output being displayed with respect to its position of scansion on the screen of a first cathode ray tube, and in which a second antenna scans in the second said angular coordinate and is adjustable in the first said angular coordinate, effectively covering a definite angular range in said first coordinate, its video output being displayed with respect to its position of scansion on the screen of a second cathode ray tube; means for producing, on the screen of the first cathode ray tube, cathode ray beam indication of the angular range covered by the second antenna in its condition of adjustment in the first coordinate, and means for producing, on the screen of the second cathode ray tube, cathode ray beam indication of the angular range covered by the first antenna in its condition of adjustment in the second coordinate.

14. In a two-coordinate radar system in which one antenna scans in one angular coordinate and is adjustable in a second angular coordinate, its video output being displayed on the screen of a first cathode ray tube, and in which a second antenna scans in the second said coordinate and is adjustable in the first said coordinate, its video output being displayed on the screen of a second cathode ray tube, the electron beam in each said cathode ray tube being caused to sweep periodically along a line the position of which varies in accordance with a coupling voltage each value of which corresponds to a value of the scanning angle of the associated antenna; means for indicating on the screen of the cathode ray tube associated with one antenna the condition of adjustment of the said other antenna, comprising in combination means for developing a voltage the value of which corresponds to the position of angular adjustment of the other antenna, means for comparing the last mentioned voltage with the coupling voltage associated with the said one antenna, and means for rendering the electron beam visible on the screen of the last mentioned cathode ray tube when the two voltages compared have a predetermined relationship.

15. The indicating means described in claim 14, further characterized by the fact that the last means there mentioned includes a tuned circuit so connected as to oscillate during a predetermined time interval after the two voltages compared have attained the said predetermined relationship, and means for rendering the cathode ray beam visible in response to peaks of said oscillation.

16. The indicating means described in claim 14, further characterized by the fact that the last means there mentioned includes a multivibrator so connected as to be shifted from its stable to its unstable state when the two voltages compared have a predetermined relationship and to return to its stable state after a predetermined time interval, this time interval being related to the sweep period of the cathode ray beam, and means for rendering the cathode ray beam visible during the said time interval.

17. The indicating means described in claim 14, further characterized by the fact that the last means there mentioned includes a multivibrator so connected as to be shifted from its stable to its unstable state when the two voltages compared have a predetermined relationship and to return to its stable state after a predetermined time interval, this time interval being related to the sweep period of the cathode ray beam, a tuned circuit so connected as to oscillate during the said time interval, and means for rendering the cathode ray beam visible in response to peaks of said oscillation.

ALWYN L. KELSEY.
ALVIN L. HIEBERT.
HOMER G. TASKER.
WILLIAM E. OSBORNE.

REFERENCES CITED

The following references are of record in the file of this patent:

UNITED STATES PATENTS

| Number | Name | Date |
| --- | --- | --- |
| 2,355,363 | Christaldi | Aug. 8, 1944 |
| 2,408,415 | Donaldson | Oct. 1, 1946 |
| 2,416,088 | Deerhake | Feb. 18, 1947 |
| 2,416,089 | Jones | Feb. 18, 1947 |